United States Patent [19]
Desjardins et al.

[11] Patent Number: 5,962,055
[45] Date of Patent: Oct. 5, 1999

[54] PREPARATION OF EDIBLE FOOD PRODUCT CUPS CONTAINING A FILLING

[75] Inventors: Jean-Jacques Desjardins, Denges; Roman Deutsch, Lutry; Ernst Heck, Vufflens-La-Ville; Jean Horisberger, Ecublens, all of Switzerland

[73] Assignee: Nestec S.A., Vevey, Switzerland

[21] Appl. No.: 09/046,859

[22] Filed: Mar. 24, 1998

[30] Foreign Application Priority Data

Mar. 25, 1997 [EP] European Pat. Off. .............. 97200882

[51] Int. Cl.⁶ .................................. A23P 1/10; A21C 3/00
[52] U.S. Cl. .......................... 426/280; 426/279; 426/282; 426/283; 426/549; 426/618; 426/622; 426/391; 426/496; 426/499; 426/503; 426/512; 426/514; 426/516
[58] Field of Search ...................... 426/279, 280, 426/282, 283, 284, 391, 512, 514, 516, 808, 549, 496, 499, 138, 618, 622, 503; 99/450.7, 450.6; 425/131.1, 133.1, 232, 310, 314

[56] References Cited

U.S. PATENT DOCUMENTS

| | | | |
|---|---|---|---|
| 3,142,266 | 7/1964 | Caferro | 425/131.1 |
| 3,480,445 | 11/1969 | Slaybaugh | 426/284 |
| 4,579,745 | 4/1986 | Mei Sue | 426/512 |
| 4,630,428 | 12/1986 | Gentry | 53/428 |
| 4,812,323 | 3/1989 | Savage | 426/138 X |
| 5,035,905 | 7/1991 | Knebl | 426/284 |
| 5,198,257 | 3/1993 | Heck et al. | 426/282 |
| 5,273,766 | 12/1993 | Long | 426/234 |
| 5,328,403 | 7/1994 | Long | 452/141 |
| 5,750,170 | 5/1998 | Daouse et al. | 426/283 |

FOREIGN PATENT DOCUMENTS

| | | | |
|---|---|---|---|
| 0638239 | 2/1995 | France | A21C 11/06 |
| 0293552 | 2/1987 | Germany | A21D 13/00 |
| 0487757 | 6/1992 | Switzerland | A23P 6/92 |
| 0434238 | 6/1991 | United Kingdom | A23G 3/20 |

*Primary Examiner*—Milton Cano
*Attorney, Agent, or Firm*—Vogt & O'Donnell, LLP

[57] ABSTRACT

Edible cups containing an edible filling are prepared by extrusion-cooking ingredients which include a cereal ingredient and extruding an extrusion-cooked product strip, passing the product strip to a heated pressing device for hot-pressing the product strip while it is still thermoplastic to form cavities in the strip which define cup structures in a row and then, incisions are made between the cup structures, a food product filling is introduced into the cup structure cavity and the strip is cut so that filled cups are obtained.

17 Claims, 1 Drawing Sheet

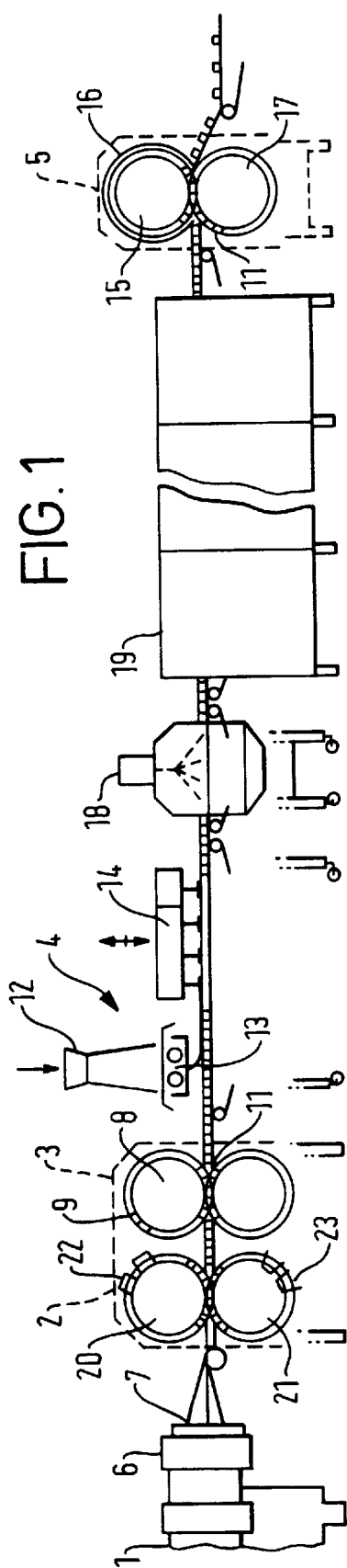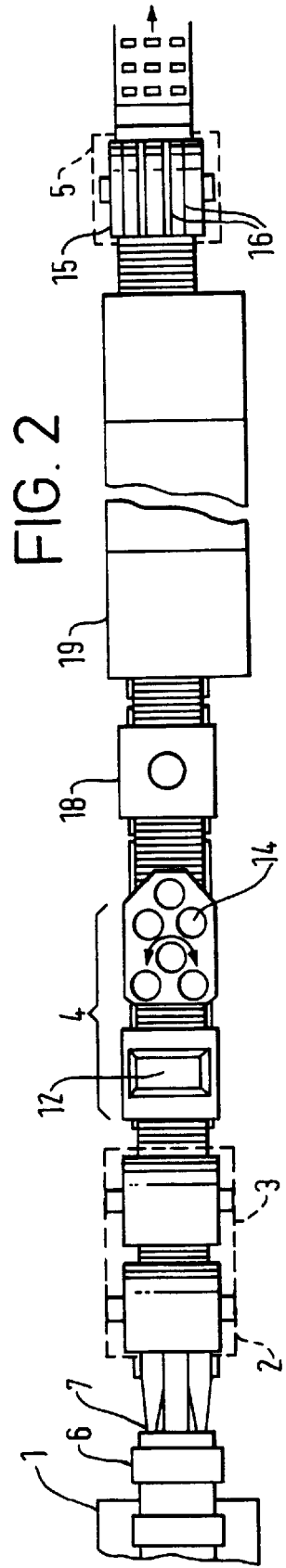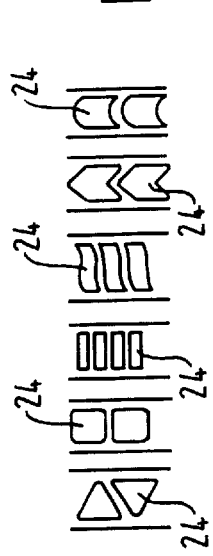

PREPARATION OF EDIBLE FOOD PRODUCT CUPS CONTAINING A FILLING

The present invention relates to preparation of a food product wherein edible cups which contain a filling are prepared by processing ingredients including a cereal ingredient for preparation of cups for receiving and containing a filling and by processing for filling the cups to obtain filled cups which provide the food product.

BACKGROUND OF THE INVENTION

European Patent Application Publication No. 0 638 239 (F. Paquier) describes a machine for the industrial manufacture of edible cups intended to contain foodstuffs, the machine cutting out individual pieces of dough from a possibly floured thinly-rolled dough, placing these pieces on a moulding former and transferring them to a cooking oven.

European Patent Application Publication No. 0 293 552 (0. Nockemann) describes a method of preparing filled cups made of cereal, in which method forming is used to prepare cooked or dehydrated cereal cups with impervious and relatively elastic walls that can be filled either with a culinary preparation in subdivided form or with a premoulded culinary preparation adapted to the size and shape of the inside of the cup, especially a frozen preparation intended to be reheated in a microwave once it has been slipped into the cup.

European Patent Application Publication No. 0 487 757 (SOCIETE DES PRODUITS NESTLE S.A.) describes a method of cutting a cooked co-extruded food product comprising a cereal-based outer case and any filling inside, in which method the product is cut by pressing between two cylindrical surfaces while the outer case is still thermoplastic following cooking-coextrusion.

SUMMARY OF THE INVENTION

The object of the present invention is to provide a method for preparing, continuously, a food product comprising edible cups which are made of ingredients which comprise a cereal and which contain an edible filling which allows a saving of any subsequent cooking or drying step to be made.

To this end, in the method of preparing filled cups made of cereal according to the present invention, cooking-extrusion is used to produce at least one flat elongate strip of extrusion-cooked ingredients comprising cereal, hot-pressing is used to form at least one row of cavities to provide cup structures in the extruded strip while it is still thermoplastic, transverse incisions are made in the strip between the cavities, a food filling is introduced into the cavities, the strip is cut longitudinally while at the same time cutting off the ends of the transverse incisions, and the individual filled cups thus obtained.

Likewise, the installation for the implementation of the method according to the present invention comprises a cooking-extrusion device, a hot-forming device, a transverse-incision device, a filling device and a longitudinal-cutting device. As a preference, the cooking-extrusion device comprises a twin-screw extruder the die of which has one or more slit-shaped outlet orifices.

Surprisingly, the present method and the present installation do indeed allow a saving of any subsequent cooking or drying stage. This is because the flat strip of cereal is already cooked at the moment it is formed by hot pressing, and the cups thus thermoformed are immediately filled and ready to be eaten without any subsequent cooking or drying operation any longer being required.

DETAILED DESCRIPTION OF THE INVENTION

In this description, the expression "flat strip of cereal" is to be understood as meaning a strip of flat cereal-based product, especially an expanded product based on cereal flour or semolina.

In order to implement the present method, it is possible to produce the flat strip of cereal by cooking-extruding at 120–200° C. at 6–15 MPa for 10–60 s in a twin-screw extruder, an ingredient mixture or paste containing, in parts by weight, 70–90 parts of cereal flour, 1–15 parts of sucrose, 1–5 parts of oil or fat and 0.5–1.2 parts of sodium chloride, to which up to 15 parts of water may be added, for example.

As a preference, the cereal used is wheat, corn, rye and/or barley. Up to 10 parts of oats can be incorporated in order to obtain a lighter product, for example.

Use can be made of all kinds of vegetable oils or fats, especially hydrogenated palm oil or coconut fat, for example.

Up to 3 parts of dextrose or fructose can be added to the mixture to make cutting easier, for example.

Up to 0.5 of a part of calcium carbonate can be added to the mixture to encourage the cooked-extruded strip to expand, for example.

Up to 8 parts of isolated or concentrated proteins, especially soya proteins, can be added to the mixture to make it easier for the product to coagulate, for example.

The mixture may have a water content of 6–14% prior to the addition of water. Up to 15 parts of water can be added so that the mixture will have a water content of 10–25% prior to cooking-extrusion, of 8–12% after cooking-extrusion and expansion, and of 3–6% after hot forming, for example.

The cooked mixture can be extruded by passing it through a die which has at least one slit-shaped outlet orifice 3–10 cm long and 0.4–1.5 mm wide, for example. The extruded strip may then have a thickness of about 2–7.5 mm following expansion after it has been extruded through this die, for example.

The cavities, and hence the cup structures, can be formed by pressing the strip between smooth-surfaced male and female mould parts heated to a temperature of 60–90° C., for example. Smooth-surfaced male mould parts may be provided at the surface of an upper roll, and smooth-surfaced corresponding female mould parts may be provided at the surface of a lower roll of a forming device that comprises one or more sets of superposed parallel rolls rotating in opposite directions. If the cavities to be formed need to have a certain depth, it may be preferable to form them in a number of passes between the male and female mould parts of increasing depth that can be provided on several successive sets of rolls. It is also possible to envisage expelling the cups from the moulds under the effect of jets of air blown through a hole provided at the centre of the female mould parts and/or male mould parts of moulds, at the moment when these female and male parts separate from one another.

As the strip may have a temperature of about 80–120° C. as it leaves the extruder, it may be recommended for it to be passed, as close as possible to the die, between a first set of forming rolls heated to a temperature of at least 80° C., it being possible for a second or several subsequent sets of forming rolls to be heated to lower temperatures, or even not to be heated at all, it being possible for a final set of forming rolls even to be cooled, for example.

It is thus possible to form cavities which have a depth of 0.5–3 cm and a generally flat bottom measuring 4 to 30 cm$^2$, the shape of which may be contrived so that the cup is visually attractive while limiting as far as possible the volume of offcuts that result from the cutting of the strip, which offcuts are recycled preferably to the beginning of the cooking-extrusion process or into the filling, after appropriate conversion, for example.

It is then possible to introduce a filling into the cavities, in particular a savoury filling, especially a filling containing cheese or meat, or a sweet filling, especially a filling containing almonds, hazelnuts, expanded cereals, flakes of cereal, chocolate and/or jam, for example. The filling may be introduced in a single operation or in successive layers of different compositions, for example.

The choice of the precise composition of the paste of which the cereal cup is made may be dictated by the choice of filling composition. However, if the filling is too moist, namely if it has an Aw, especially an Aw of above 0.5, such that migration of moisture into the paste is a risk, it may be envisaged for the cavity of the cup to be rendered impermeable by spraying a starch solution into it and passing it under infrared radiation, for example. Complete coating of the cup by dipping or glazing, for example, may also be envisaged.

Once the filling has been introduced into the cavities, the cup can be closed with a pastry lid or with a hermetic layer such as a layer of sugar or of chocolate, for example.

The transverse incisions in the strip between the cavities can be made at any desired moment between the instant the strip leaves the die and the instant the strip is cut longitudinally, cutting off the ends of the transverse incisions just before the individual filled cups obtained are collected.

The installation for the implementation of the method therefore comprises a cooking-extrusion device, a hot-forming device, a transverse-incision device, a filling device and a longitudinal-cutting device, the cooking-extrusion device preferably comprising a twin-screw extruder, the die of which has one or more slit-shaped outlet orifices.

The hot-forming device preferably comprises one or more sets of superposed parallel rolls rotating in opposite directions (i.e., "counter-rotating"), smooth-surfaced male mould parts being provided at the surface of an upper roll and smooth-surfaced corresponding female mould parts being provided at the surface of a lower roll. These rolls may be heated by the circulation of a heating fluid inside the rolls, the heat being transmitted to the male and female mould parts by thermal conduction of the material of which the rolls are made, for example. A final set of rolls may even be cooled by the circulation of a cooling fluid, for example.

The transverse-incision device may comprise two superposed parallel rolls rotating in opposite directions, it being possible for the surface of an upper roll to have transverse cutters and it being possible for the surface of a lower roll to have receiving and conveying cavities, for example.

The filling device may comprise a feed hopper, distribution rollers and balancing means, for example.

The longitudinal-cutting device may comprise two superposed parallel rolls rotating in opposite directions, it being possible for the surface of an upper roll to have circular longitudinal cutters, and it being possible for the surface of a lower roll to have receiving and conveying cavities, for example.

The installation may further comprise a spraying device downstream of the filling device and/or a cooling tunnel upstream of the longitudinal-cutting device, for example.

The installation according to the present invention is described below with reference to the drawing Figures and by way of example.

BRIEF DESCRIPTION OF THE DRAWING FIGURES

FIG. 1 diagrammatically depicts a side view of one embodiment of the installation.

FIG. 2 diagrammatically depicts a view from above of the embodiment of the installation depicted in FIG. 1.

FIG. 3 depicts a view from above of various shapes of cup cut from the strip.

DETAILED DESCRIPTION OF THE DRAWING FIGURES

In the embodiment depicted in FIGS. 1 and 2, the present installation comprises a cooking-extrusion device (1), a hot-forming device (2), a transverse-incision device (3), a filling device (4) and a longitudinal-cutting device (5).

The cooking-extrusion device comprises a twin-screw extruder (1), the die (6) of which has three slit-shaped outlet orifices (7).

The forming device (2) comprises a set of superposed parallel rolls (20, 21) rotating in opposite directions, smooth-surfaced male mould parts (22) being provided at the surface of an upper roll (20) and smooth-surfaced corresponding female mould parts (23) being provided at the surface of a lower roll (21). (i.e., a roll having male part projections and a roll having female part cavities).

The transverse-incision device (3) comprises two superposed parallel rolls rotating in opposite directions, the surface of an upper roll (8) having transverse cutters (9) and the surface of a lower roll (10) having receiving and conveying cavities (11).

The filling device (4) comprises a feed hopper (12), distribution rollers (13) and balancing means (14).

The longitudinal-cutting device (5) comprises two superposed parallel rolls rotating in opposite directions, the surface of an upper roll (15) having longitudinal cutters (16) and the surface of a lower roll (17) having receiving and conveying cavities (11).

The installation further comprises a spraying device (18) downstream of the filling device (4) and a cooling tunnel (19) upstream of the longitudinal-cutting device (5).

As has been depicted in FIG. 3 (the respective elongate strips (elongated with reference to strip width defined between strip side edges) can be imagined as travelling upwards from the bottom of the figure), it is possible to cut from the strip blanks (24), for example, triangular, square, rectangular, S-shaped, chevron-shaped or arc-shaped blanks, the shape of which may be contrived so that the cups are visually attractive while at the same time restricting as far as possible the amount of offcuts that result from cutting the strip.

EXAMPLES

The Examples below, which are set forth by way of illustration, describe the method according to the present invention in greater detail, and percentages and parts are given by weight.

Example 1

Using an installation similar to the one depicted in FIGS. 1 and 2, slightly flared cups which are 2 cm deep and have a rectangular bottom measuring 2×7 $cm^2$ are prepared.

In the twin-screw extruder of this installation, the residence time for the mixture is 30 s, the temperature 180° C.

and the pressure 8 MPa. The die has three slit-shaped outlet orifices 7.5 cm long and 0.9 mm wide.

The forming device comprises three successive sets of rolls, on which the profiles have respective heights and depths of 1, 1.5 and 2 cm. The first set of rolls is heated to 80° C., the second set of rolls is heated to 60° C. and the third set is not heated.

The extruder is fed with a mixture containing 87.7 parts of wheat flour, 10.7 parts of white rye flour, 5 parts of isolated soya proteins, 2.8 parts of sucrose, 1.9 parts of corn oil, 0.85 of a part of sodium chloride, 0.48 of a part of calcium carbonate and 0.28 of a part of dextrose and to which 4.7 parts of water are added. The mixture thus has a water content of 18.2% as it enters the device, 8.9% after expansion on leaving the extruder and 3% after hot forming.

The strip has a thickness of 4.5 mm after expansion, the thickness of the walls of the cup formed being about 1.5 mm.

The cups are filled with a cheese-based preparation which has an Aw of 0.5 comparable with that of their walls.

Example 2

The procedure followed is similar to the one described in Example 1, the exception being that the extruder is fed with a mixture containing 77.3 parts of wheat flour, 9.45 parts of white rye flour, 4.9 parts of isolated soya protein, 11.9 parts of sucrose, 2 parts of corn oil, 0.75 of a part of sodium chloride, 0.42 of a part of calcium carbonate and 2 parts of dextrose to which 5.5 parts of water are added. The mixture thus has a water content of 18% as it enters the device, 9.1% after expansion on leaving the extruder and 4% after hot forming.

The cups are filled with a first layer of roughly crushed hazelnuts, a second layer of hazelnut-chocolate cream and a third layer of puffed rice. The cups are closed with a layer of chocolate.

Example 3

The procedure followed is the one described in Example 2 to obtain cups which are then filled with a mixture of strawberries and hazelnuts on a caramel base and are then coated in chocolate.

We claim:

1. A process for preparing edible cups which contain a filling comprising the steps of:

extrusion-cooking, in an extruder, a mixture which comprises a cereal ingredient to produce a cooked product and extruding the cooked product from the extruder to obtain an elongate thermoplastic flat, cooked product strip;

heating a forming press device and passing the flat thermoplastic product strip obtained from the extruder to the heated press device and pressing the product strip while the product is still thermoplastic for forming an elongate row of cavities in the strip between elongate strip edges for forming a formed strip which comprises an elongate row of cup structures;

incising the formed strip at positions between the cup structures so that each cup structure in the elongate row is incised from adjacent cup structures so that upon cutting the formed strip to cut strip portions between cup structures and the strip edges, the cup structures separate one from another;

filling the cavities of the cup structures with an edible filling to obtain filled cup structures; and cutting the formed strip to cut off, from the cup structures, strip portions which are between the cup structures and strip edges so that the filled cup structures separate one from another to obtain individual cups containing filling.

2. A process according to claim 1 wherein the thermoplastic product strip is passed to and pressed by the heated forming press device so that the formed strip has a moisture content less than the thermoplastic strip obtained from the extruder.

3. A process according to claim 1 or 2 wherein the mixture is extrusion-cooked and extruded so that the strip product obtained from the extruder has, by weight, a moisture content of from 8% to 12% and wherein the thermoplastic strip is passed to and pressed by the heated forming press device so that the formed strip has, by weight, a moisture content of from 3% to 6%.

4. A process according to claim 3 wherein the mixture prior to extrusion-cooking comprise, by weight, a moisture content of from 10% to 25%.

5. A process according to claim 4 wherein the mixture is extrusion-cooked under a pressure of from 6 MPa to 15 MPa and for a time of from 10 seconds to 60 seconds and the mixture subjected to extrusion-cooking comprises, in parts by weight, from 70 parts to 90 parts cereal flour, from 1 part to 15 parts sucrose, from 1 part to parts of a substance selected from the group consisting of oils and fats, from 0.5 part to 1.2 parts sodium chloride and added water so that water is present as an added ingredient and in an amount of up to 15 parts.

6. A process according to claim 5 wherein cereal flour is selected from the group consisting of wheat, rye, barley and corn flour.

7. A process according to claim 6 wherein the mixture further comprises oats and the oats is present and in an amount of up to 10 parts.

8. A process according to claim 1 or 2 wherein the mixture is are extrusion-cooked at a temperature of from 120° C. to 200° C. and the forming press device is heated for pressing the strip product at a temperature of from 60° C. to 90° C.

9. A process according to claim 1 wherein the cereal ingredient is selected from the group consisting of cereal flour and semolina.

10. A process according to claim 1 wherein the cereal ingredient is selected from the group consisting of wheat, rye, barley and corn.

11. A process according to claim 1 wherein the thermoplastic strip is extruded from a slit orifice having a length of from 3 cm to 10 cm and a width from 0.4 mm to 1.5 mm and wherein the forming press device forms cup structures having cavities having a depth of from 0.5 cm to 3 cm and a cup structure bottom base of from 4 $cm^2$ to 30 $cm^2$.

12. A process according to claim 1 further comprising, after pressing to form the formed strip and before filling, comprising spraying a starch solution within the cavity onto the cup structure and passing the sprayed structure under infrared radiation for rendering the structure impermeable with respect to the filling.

13. A process according to claim 1 wherein the thermoplastic strip is passed to and pressed between two parallel counter-rotating heated rolls, wherein one roll comprises male part projections wherein a second roll comprises female part cavities so that upon rotation, the two rolls form the cup structures.

14. A process according to claim 13 further comprising passing the formed strip to and pressing between at least one further set of parallel counter-rotating rolls for further forming the cavities and the cup structures, wherein one roll of each further set comprises male part projections and wherein a second roll of each further set comprises female part cavities so that upon rotation, each further set further forms the cup structures.

15. A process according to claim 1 wherein the formed strip is passed to and between two parallel counter-rotating rolls wherein one roll comprises structure which defines cavities for receiving the cup structures and one roll comprises cutting members for making the incisions in the formed strip between the cup structures.

16. A process according to claim 1 wherein the filled cup structures are passed to and between two parallel counter-rotating rolls wherein one roll comprises structure which defines cavities for receiving the cup structures and one roll comprises cutting members to cut off the strip portions to separate the filled cup structures one from another.

17. A process according to claim 1 wherein the filling step comprises a substance selected from the group consisting of meat, cheese, an almond, a hazelnut material, an expanded cereal, cereal flake, jam and chocolate.

* * * * *

UNITED STATES PATENT AND TRADEMARK OFFICE
CERTIFICATE OF CORRECTION

PATENT NO. : 5, 962, 055
DATED : October 5, 1999
INVENTOR(S) : Jean-Jacques DESJARDINS, et al.

It is certified that error appears in the above-identified patent and that said Letters Patent is hereby corrected as shown below:

Column 2, line 8, insert a comma after "cooking-extruding".

Column 6, line 36 (line 2 of claim 8), delete "are".

Column 6, line 47 (line 3 of claim 11), after "width", insert -- of --.

Column 8, line 7 (line 3 of claim 17), delete "material".

Signed and Sealed this

Twenty-first Day of March, 2000

Attest:

Q. TODD DICKINSON

Attesting Officer

Commissioner of Patents and Trademarks